March 29, 1927.
C. W. SHIPLEY ET AL
1,622,470
HITCH FOR SEMITRAILERS
Filed Sept. 27, 1922
3 Sheets-Sheet 3
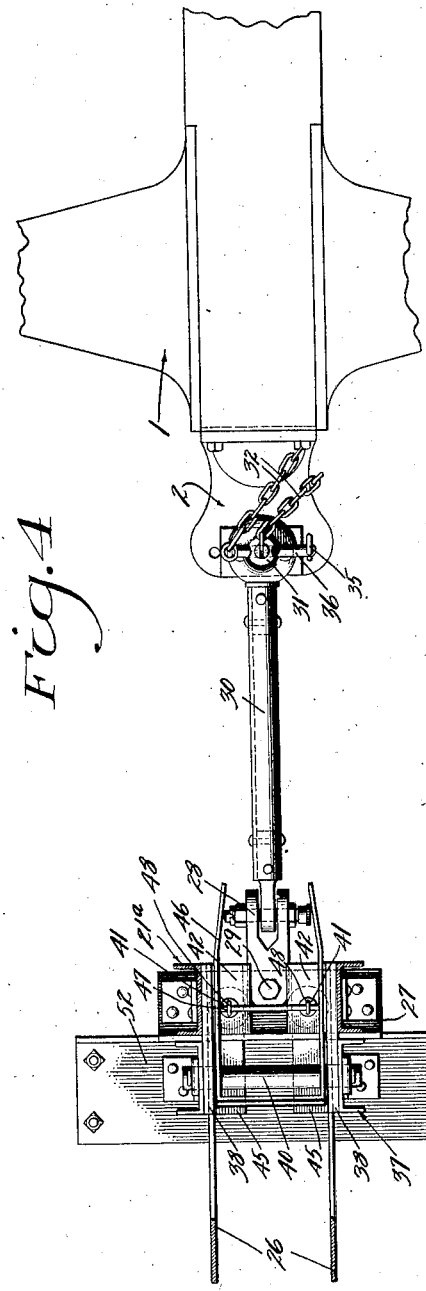
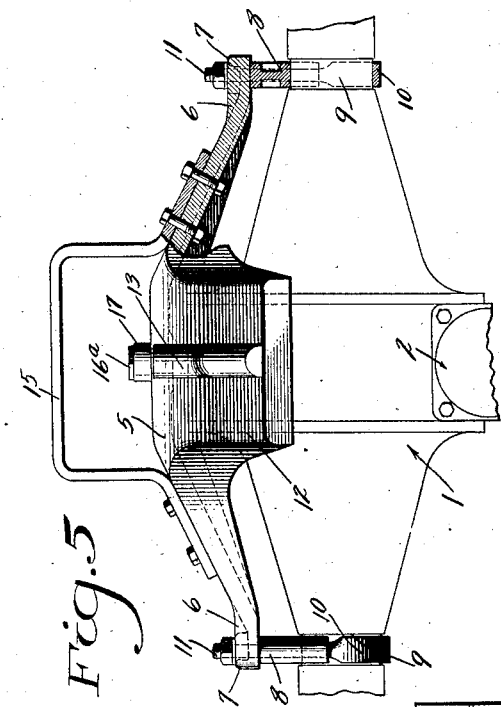
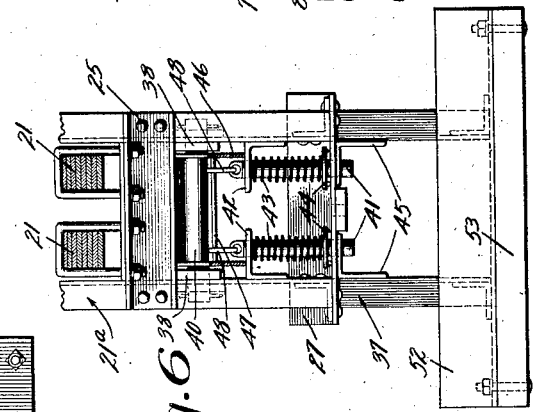
Inventors
Caleb W. Shipley
Rufus B. Jones
By
Attorneys Patented Mar. 29, 1927.

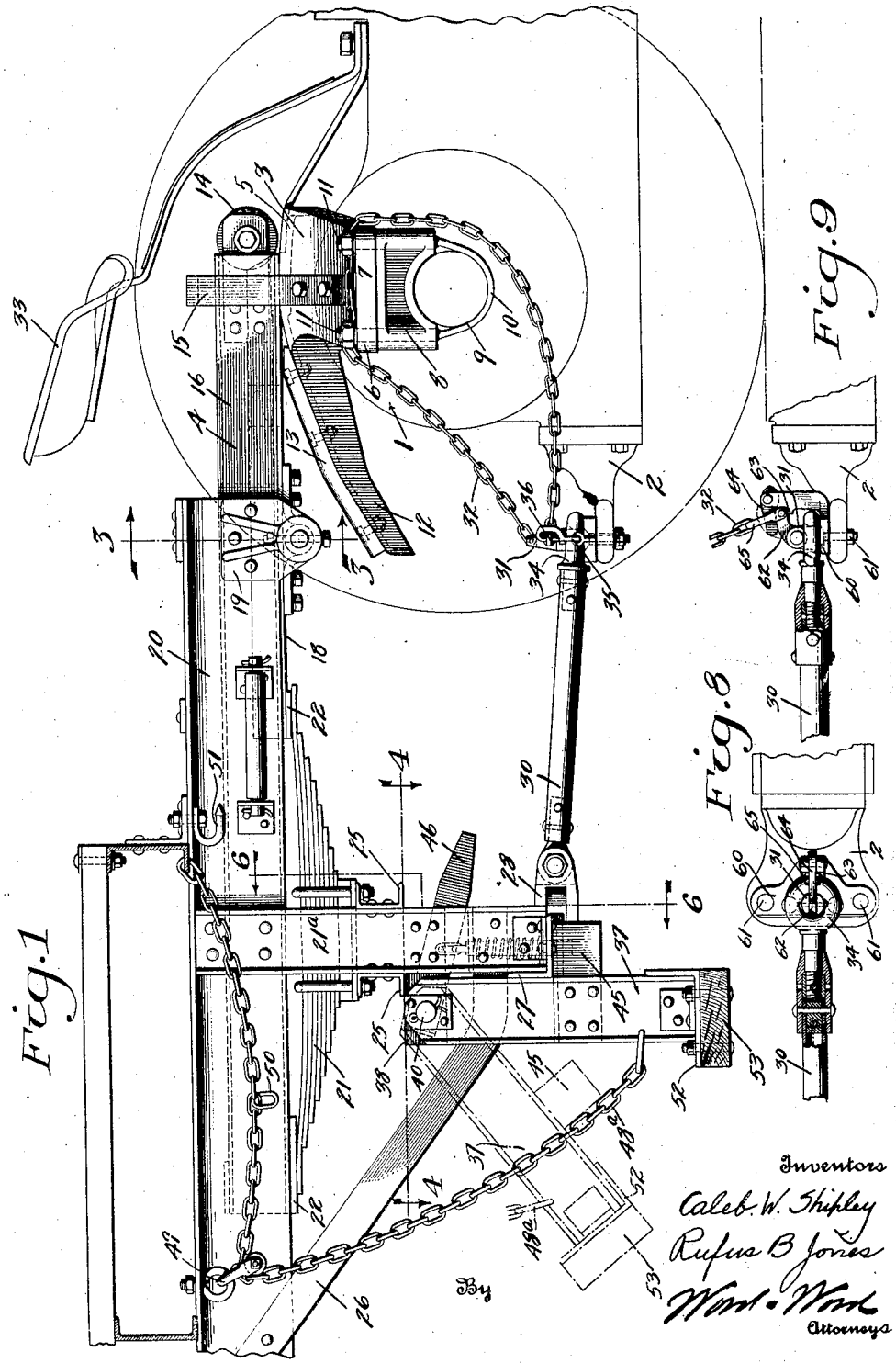

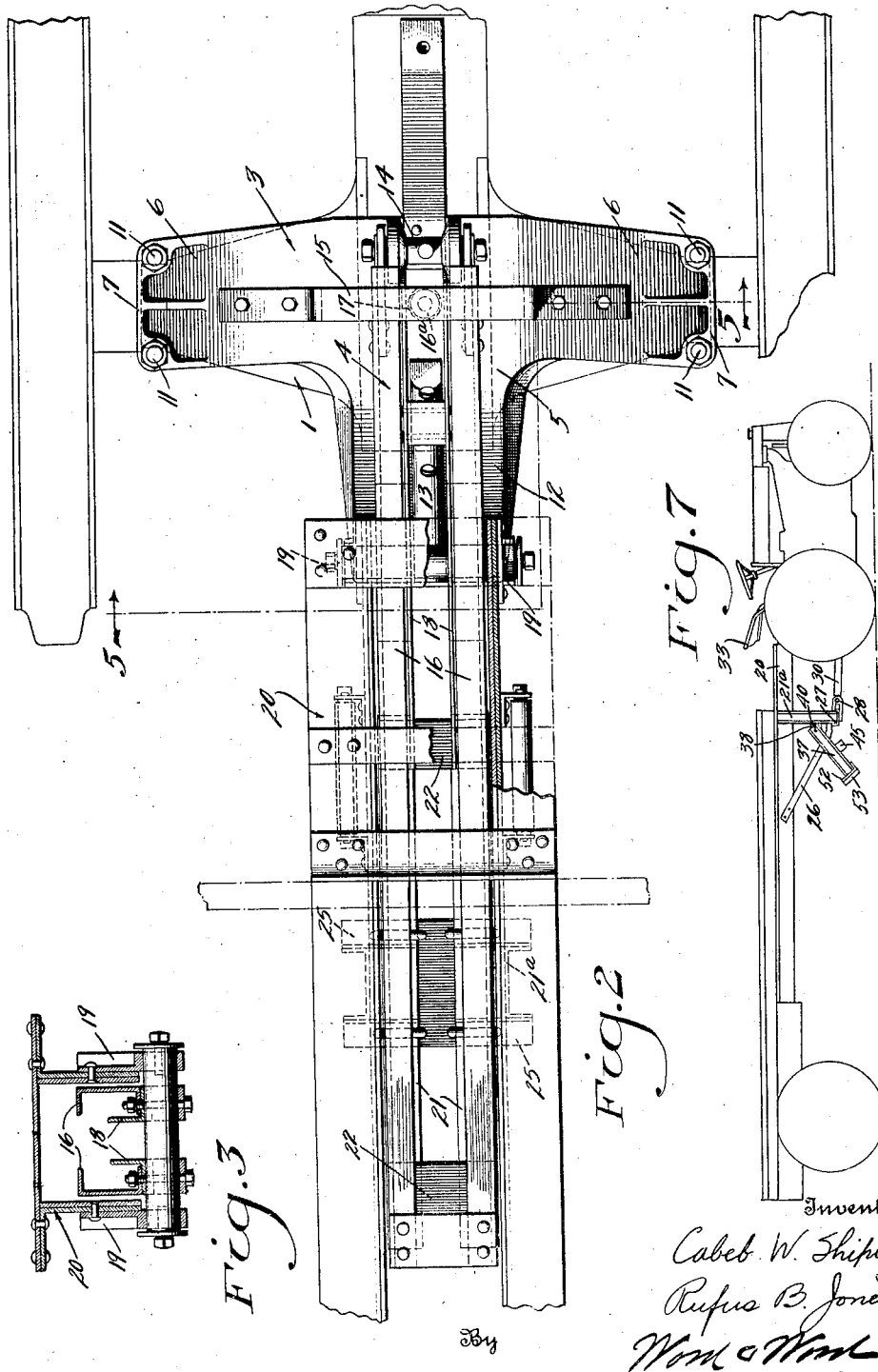

1,622,470

UNITED STATES PATENT OFFICE.

CALEB W. SHIPLEY AND RUFUS B. JONES, OF CINCINNATI, OHIO, ASSIGNORS TO THE TRAILMOBILE COMPANY, OF CINCINNATI, OHIO, A CORPORATION, OF OHIO.

HITCH FOR SEMITRAILERS.

Application filed September 27, 1922. Serial No. 590,804.

Our invention relates to improvements in semi-trailers and particularly to the coupling and load-sustaining features of a semi-wheeled trailing vehicle or trailer in relation to the rear end of a propelling vehicle or tractor.

The commercial tractor as of the "Fordson" type primarily as a drawing vehicle provides for a draft connection below the center of the rear axle, necessitated for drawing or dragging heavy loads, to allow for making low draft connection for the greatest traction efficiency and to prevent the forward end of the tractor from rearing. This type of tractor is being extensively converted from land to road service by changing the wheels making available its traction power for general hauling purposes and particularly when coupled to a semi or two-wheeled trailer, whereby the tractor carries or sustains a portion of the load. This form of vehicle train is highly desirable as the weight of the forward end of the trailer and its load give traction to the driving wheels of the tractor over roadways without necessitating a specially loaded wheel. The entire outfit is compact, easily manipulated, turned and backed. It is therefore an object of the invention to utilize the central low hung hitch connection of the commercial tractor for draft purposes and to provide the tractor with trailer load sustaining means, designated as a bolster, above the rear axle, rigidly fixed upon the rear axle of the tractor bridging the central portion thereof and bringing the weight at the hubs of the rear wheels. This improves the traction of the tractor by putting the weight on the driving wheels and carries the weight in such a way as to entirely avoid any harmful effects, nor to cause disturbance to the axle or driving gear housing by carrying weight to its disadvantage, and also provides for trailer steering. Thus independent load sustaining and draft connections are made between trailer and tractor.

Another object of the invention is to provide a tractor with a bolster fixed upon the axle or axle housing of the rear driving wheels and at or near the hubs of the wheels for supporting and connecting the forward end of a two-wheeled trailer, the connections providing freedom of movement or universal movement of the tractor and trailer under all positions assumed by either.

Another object of the invention is to provide a trailer with a forwardly extended vertically yielding tongue or reach for cushioning the load to relieve the tractor and trailer of excessive shocks and vibration.

Other advantages and features of the invention will be more fully set forth in the description of the accompanying drawings forming a part of this application, in which:

Figure 1 is a side elevation of the bridge plate secured upon the rear axle of the tractor showing the fore part of the trailer as connected with the tractor.

Figure 2 is a top plan view of the same.
Figure 3 is a section on line 3—3, of Fig. 1.
Figure 4 is a section on line 4—4, of Fig. 1.
Figure 5 is a section on line 5—5, of Fig. 2.
Figure 6 is a section on line 6—6, of Figure 1.

Figure 7 is a diagrammatic view of tractor and trailer connected as a unit.

Figures 8 and 9 are respectively a top plan and side elevation of a modified form of drawbar coupling connection, a portion of the bar being shown in section.

The drawings illustrate the rear end of a motor vehicle or draft unit for propulsion and steering designated as a tractor to which the load carrying or trailing vehicle designated as a trailer is coupled or connected. The tractor shown is of the "Fordson" type providing a rear axle and gear housing 1 comprising right and left hand tubular casings or sleeves connecting with a central gear and differential casing, having at its lower rear side a hitch cap 2 with which trailer draft coupling connections are made.

While it is very efficient and admirable to make central coupling or drawbar connection directly with the rear axle housing of the tractor for draft purposes, it will not equally serve for load sustention as to sustain the heavy weight and load of a semi-trailer or two wheeled vehicle, especially when the load is not balanced over the wheels of the semi-trailer.

Downwardly bearing weight upon the central portion of the axle housing would subject the housing to bending stresses, causing undue vibration, especially in traveling rough roads with heavy loads and injury to the transmission gearing enclosed and journaled within the housing.

Downwardly bearing weight on the tractor at any position in rear of the rear axle causes the front wheels of the tractor to leave the ground.

If the front wheels are only slightly lifted from the ground, or if the weight on the front wheels is even slightly removed, the result is loss of steerage, steerage being only possible by sufficient contact of the front wheels with the ground. If this weight is increased the tractor will be raised and with sufficient weight will be upset, and under such condition if the front wheels meet an obstruction the opportunities for loss of steerage and rearing are greatly increased. The action of the worm of the transmission gearing which moves the tractor, has a tendency to lift the front wheels, making the location of this downward bearing weight additionally necessary.

The rear axle is provided with a load sustaining member, comprising a bridge beam or bolster 3 upon which a bar or tongue 4 extending horizontally from the trailer connects directly over the center of the gear casing portion of the axle housing. The bridge beam spans the rear axle housing from approximately the opposite ends thereof, or from hub to hub, so that no weight comes near the center of the housing. The beam is longitudinally of arch form, having a plane central crown portion 5, and horizontal ends 6, each strengthened by a marginal or edge flange 7. The opposite ends of the beam are respectively supported upon pillow blocks 8—8, each block having a straddled engagement with the axle housing and with an annular groove 9 in the housing. A U-coupling clip 10, within the annular groove 9, engages about the underside of a pillow block and the shanks 11—11 thereof extend through the pillow block and end of the beam for rigidly securing the beam to the axle. A downwardly inclined tail 12 extends centrally from the bridge beam to provide an inclined plane or skid upon which the tongue of the trailer slides, to elevate automatically the forward end of the trailer chassis and its supporting prop from the ground, transferring a portion of the weight of the trailer and load to the bridge beam, and guide the tongue centrally of the beam for coupling. The incline 12 has a central rib rail 13 which is engaged by a spool shaped roller 14 journaled upon the end of the tongue to reduce friction in the translation of the tongue upon the incline. The rail 13 and roller 14 are generally eliminated for trailers of light capacity, and employed when the weight to be carried renders it desirable, the roller assisting the inertia of the tractor in making a coupling engagement. The rail stops short of the central platform portion of the beam, so as not to form any obstruction to the swing of the tongue when resting upon the platform. A U-shaped saddle bar 15 is secured upon the upper side of the bridge beam or bolster looping over the platform portion of the beam confining or limiting vertical movement of the trailer tongue and securing the tractor against excessive tilting.

The tongue of the trailer in the preferred form, is of fabricated structure comprising a pair of oppositely disposed channel iron bars 16—16 secured together as a unit with spacing therebetween, the spacing at the forward end provided with a way to receive the anchoring pin 16$^a$ fixed to the bridge beam and projecting centrally from the platform portion thereof. The pin 16$^a$ journals a roller 17 tracking with and between the opposite flanges of the angle bars 18—18 respectively secured to the lower flange of the channel bars 16—16, as shown in Fig. 3. The construction of the tongue provides a central longitudinal guide way within which the roller 17 is engaged, adapting the tongue to slide upon the platform surface of the bridge beam longitudinally, to swing horizontally about the roller, and be confined against transverse motion upon the bridge beam for steering the trailer. The tongue is pivotally mounted upon a horizontal axis carried by bracket bearings in hangers 19—19 fixed to the frame 20 of the trailer chassis or underframe, which provides for vertical swing of the tongue, as a lever. The tongue preferably for heavy sizes of trailer at the rear side of its axis engages upon the opposite ends of a plural leaf spring 21 secured to a stationary prop or leg section 21$^a$ of fabricated structure dependingly secured to the vehicle frame 20. The opposite ends of the main leaf of the spring respectively slidably engaging bearing plates 22—22 fixed to the under side of the channel bars of the tongue. The vehicle frame and prop is made up of angle, channel and plate iron, with the parts thereof riveted together, a practice now commercially followed in trailer design for obtaining heavy reinforcement and stout construction. It is therefore that the stationary leg section 21$^a$ comprises two channel bars spaced apart and secured to the vehicle underframe and together by cross plates as the transverse channel bars 25—25 to which the spring 21 is secured and the skeleton form of structure of leg or prop permits the spring to be supported centrally of the leg and longitudinally beneath the tongue.

A pair of brace bars 26—26 connect at one end with the vehicle underframe 20 and at the opposite end to a respective channel iron forming the stationary prop or leg section 21$^a$ and at the lower end thereof and approximately at a point at which the draw bar connections are made for coupling the trailer to the tractor. The pulling or draft strains are therefore more directly applied to the brace bars and vehicle underframe, relieving the stationary strut which serves under draft condition to reinforce the brace bars. The drawbar acting horizontally takes its pull in a straight line to the hitch of the tractor, and the position of the draft connection below the center of the rear axle has a tendency to hold the front wheels of the tractor downwards instead of lifting them off of the ground. An angle iron 27 as a cross member connects and is riveted to the lower ends of the channel iron forming the stationary prop to which a clevis 28 is pivotally connected intermediate the channel iron of the stationary prop by a bolt 29. A drawbar 30 connects at one end to the clevis 28 and at its opposite end pivotally to the hitch cap 2 of the tractor by means of an eye 34 upon the end of the drawbar, either rigidly secured upon the end of the drawbar as shown in Fig. 1 or swivelled as shown in Figs. 8 and 9. The coupling may be made by means of a coupling pin 31 rigidly bolted to the hitch cap. The pin at its head end carries a chain 32 which is utilized by the driver of the tractor for coupling the drawbar to the hitch cap from the seat 33 of the tractor in the operation of engaging the tongue of the trailer upon the bridge of the tractor. The chain, previous to making a coupling is manually threaded through the eye 34 at the end of the drawbar, whereby the driver elevates the forward end of the drawbar for guiding the eye 34 over the coupling pin 31 as the skid or bridge on the tractor backs under the forward end of the trailer tongue. The chain is then looped about the bridge, as shown in Figure 1, after which a lock pin 36 secured to the end of the chain is engaged through an orifice transversely in the coupling pin 31, locking the eye of the draw bar over the coupling pin and the end of the lock pin 36 has an orifice therethrough for engagement with the snap hook 35.

A swinging prop section 37 as a fabricated channel and angle iron structure provides a hinged extension for the stationary prop section when the trailer is disconnected from the tractor for supporting the forward end of the trailer, with the tongue at an elevation to be engaged by the skid of the bridge beam on the tractor, so that as the tongue rides upon the skid in backing into a trailer coupling position the prop in its extended position will be raised from contact with the ground. To provide for additional ground clearance the prop is made sectional. The swinging prop section 37 is pivoted by a pin 40 to a pair of bracket arms 38 fixed to and projecting from the stationary prop section 21ª, and when in commission or operative position is locked to the stationary prop section. The means for locking the prop sections together comprises a pair of depressible detents 41—41 of duplicate construction, each slidably engaged at one end through a perforation in the cross member 27 and at the opposite end respectively through a perforation through the projecting limb of an angle plate 42 fixed to the prop section 21ª. Each detent is provided with a spring 43 engaged about the detent and between the angle plate 42 and collar 44 mounted upon the detent for yieldingly moving the detent so that it will snap into engagement with an opening in a bracket extension 45 fixed to and extending from the swinging prop section 37 when the opening comes into registration with the detent. A lever 46, of U-form, is pivoted upon the pin or bridge axis of the prop section 37 which is provided with a cross rod 47 engaged through the links 48—48 respectively engaged through eye openings in the head ends of the detents connecting the detents with the lever 46. Manually raising the lever 46 pulls out the detents from their locking engagement with the swinging prop section, releasing the swinging prop section adapted then to be swung upwardly to a raised position. A chain 48ª is employed for raising the swinging prop section and sustaining the same in its raised position. One end of the chain 48ª is in connection with the prop section 37, the chain passing through a guide pulley 49 secured to the vehicle underframe and extending forwardly with the forward end permanently connected to the underframe, the chain carrying a hitching link 50 for engagement with the hook 51 fixed to the vehicle frame for holding the swinging prop section in its raised or elevated position. The bar end of the swinging prop section 37 has an extended foot plate 52 of angle iron riveted to the upright channel member of the prop and this foot plate has a shoe 53 removably fixed thereto. The shoe is preferably of wood to take the chafe on grounding and protect the prop from injury, and so that the height of the swinging section may be increased or decreased according to the user's necessities.

In the modified form of drawbar coupling connection with tractor shown in Figs. 8 and 9 a hitch locking device comprising a base casting 60 is secured upon the hitch 2 by means of bolts 61. The base 60 is provided with a pin or lug 31 formed integral therewith over which the eye 34 at the end of the drawbar 30 is engaged. A link 62 at one end is pivotally secured upon the free end of the pin or lug 31 and the chain 32 is hingedly connected to its opposite end, the link being adapted to be swung to a position at an angle to the pin forming a hasp or latch over the eye of the drawbar and in locking position rests upon a laterally projecting lug or a bracket arm 63 extending from the base opposite the pin or lug 31. A clip 64 is pivoted upon the free end of the bracket arm adapted to be engaged over the link 62 and within the yoke link 65 connecting the chain to the link 62 as shown in Fig. 9 securely locking the link or hasp 62 in its closed position. Pulling upward upon the chain releases the parts for disconnecting the drawbar. The chain is adapted to be threaded through the eye of the drawbar for making a coupling connection from the driver's seat as previously explained.

Having described our invention, we claim:

1. The combination of a two-wheeled trailer having a rigid load-bearing and trailer-steering tongue, and a tractor with its rear axle casing and differential gear-housing, a bridge supported near the ends of the casing, the trailer tongue being operatively supported upon a medial portion of the bridge immediately over the differential gear housing, and means constituting a draft connection between a rear portion of the tractor and a forward portion of the trailer.

2. In a tractor having a rear axle casing, an arched beam adapted to extend longitudinally of the axle casing and at its extremities secured to the axle casing adjacent the wheel bearing of the axle casing, the beam providing a central crown portion for sustaining a tongue of a trailer connecting with the tractor, and a downwardly inclined lateral extension projecting from one side of the beam at the crown portion thereof for guiding a trailer tongue upwardly on the crown of the beam.

3. The combination of a two-wheeled trailer having a rigid load-sustaining and trailer-steering tongue, a tractor with its rear axle casing and differential gear housing, a bridge attachable at the ends of the casing, the said tongue being pivotally supported medially on the bridge over the differential gear housing, means for automatically mounting the tongue on said bridge when the tractor is backed in relation to the trailer, and means constituting a draft connection between a rear portion of the tractor and a forward portion of the trailer.

4. In a road tractor, the combination of a wheel tractor portion provided with a driving axle, traction wheels, axle housing and guiding wheels, and a trailer provided with rear wheels, of two-fold flexible means of connection between said two portions, one portion of said connection being substantially applied at the upper portion of the axle housing and supported by end portions of the axle housing, providing a load-sustaining bridge over the medial portion of the axle housing, means on said bridge for guiding, elevating, forward shifting and supporting the front end of the load-sustaining member of the trailer portion, said two-fold means constituting a compensatory link connection uniting said front and rear vehicle sections.

5. In combination with the traction wheels, an axle housing of a tractor of the Fordson type, a bridge over the medial portion of the axle housing, means supporting said bridge from end portions of the axle housing, a coupling and draft connecting means at a lower rear portion of said housing, and an arcuate member on the bridge for guiding, elevating, shifting and slidably supporting a trailer tongue on the bridge seat constituted by said arcuate member.

6. In combination with the weight-supporting member of the coupling and draft member of a two-wheel trailer, and with the traction wheel axle and axle housing of a tractor of the Fordson type, a bridge over the medial portion of the axle housing, piers supporting the ends of said bridge in relation to end portions of said housing, means for connecting a trailer draft member to the lower portion of the housing, and an arcuate member on the bridge for cooperating with the weight-supporting member of the trailer, the arcuate member being adapted to guide, elevate, shift and support said trailer member on the bridge to impose weight on the traction wheels at a point above the axle, with the result, in connection with said draft member, tending to hold the driving wheels of the tractor to the ground.

7. In combination with the weight-supporting member and coupling of draft member of a two-wheel trailer and with the traction wheels, driving axle and axle housing of a tractor, means for coupling the draft member to the lower portion of the axle housing, means supported at end portions of the axle housing providing a bridge over the medial portion thereof, means on the bridge for cooperating with the weight-supporting member of the trailer adapted to guide, elevate, shift and support the weight-supporting member of the trailer to and at a point over the medial portion of the axle housing, and means constituting a swivel and slide connection between said weight-supporting member of the trailer and its seat, which is constituted by a portion of the said guiding means.

8. In a device of the class described, a device for attachment to the axle housing of a tractor, adapting the tractor for trailer service, and comprising a member attached at end portions of the axle housing having a bridge member at its outer ends spanning and superposed in relation to the medial portion of the axle housing, the medial portion of said bridge member being formed to constitute a guide, jack, and a support for the weight imposing tongue member of a trailer, independent of the draft connection.

9. In a device of the class described, a device for attachment to the axle housing of a tractor, adapting the tractor for trailer service, and comprising a member attached at end portions of the axle housing having a bridge member at its outer ends spanning and superposed in relation to the medial portion of the axle housing, the medial portion of said bridge member being formed to constitute a guide, jack and a support for the tongue member of a trailer, and means for making a draft connection between the lower portion of the housing and a trailer.

10. In combination with a motor vehicle and a trailer, of a hitch comprising a coupling head on the motor vehicle, a draft link pivoted to the trailer, means for connecting the link to the head so that the entire draft from the motor vehicle to the trailer will be through the link, a tongue on the trailer above the link having a bifurcated head and a vertical pin on the motor vehicle receivable between the bifurcated portions of the tongue when the trailer is coupled to the motor vehicle, the tongue having free sliding movement with respect to the motor vehicle when the link is functioning as a draft element.

11. A trailer comprising a frame, a pair of wheels, means for mounting said frame on said wheels, a forked tongue projecting from one end of said frame, a standard depending from said frame, a draw bar connected to said standard below the level of the tongue, a saddle adapted to be mounted on a tractor over the drive wheel axle housing thereof, said draw bar adapted to be connected to said tractor housing below the level of the axis of the tractor and drive wheels and a guide bolt on said saddle which said tongue is adapted to straddle and by which said tongue is guided.

12. A trailer comprising a frame, a pair of wheels on which said frame is mounted, a forked tongue projected horizontally from one end of said frame, a standard depending from said frame, a draw bar connection to said standard below the level of the tongue and adapted for connection with the draw bar coupling of a tractor at a point below the drive wheel axes of the tractor, said tongue being of greater length than said draw bar.

13. A trailer comprising a frame, a pair of wheels, means for mounting said frame on said wheels, a forked tongue projecting from one end of said frame, a standard depending from said frame, a draw bar connected to said standard below the level of the tongue, a saddle adapted to be mounted on a tractor over the drive wheel axle housing thereof, said draw bar adapted to be connected to said tractor housing below the level of the axis of the tractor and drive wheels, and a guide bolt on said saddle which said tongue is adapted to straddle and by which said tongue is guided.

In witness whereof, we hereunto subscribe our names.

CALEB W. SHIPLEY.
RUFUS B. JONES.